Figure 10:
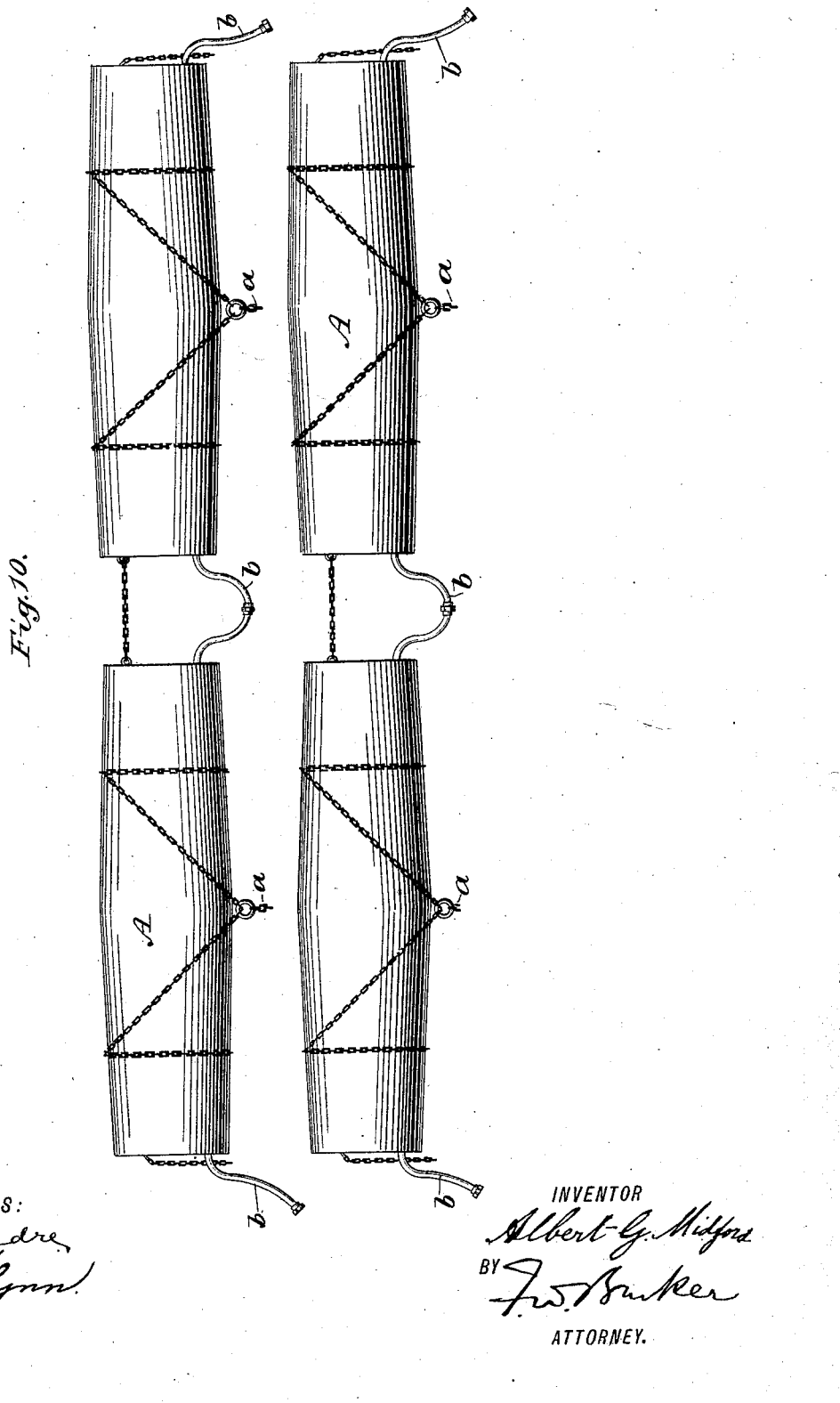

(No Model.) 5 Sheets—Sheet 1.
A. G. MIDFORD.
APPARATUS FOR RAISING SUNKEN VESSELS.
No. 572,364. Patented Dec. 1, 1896.
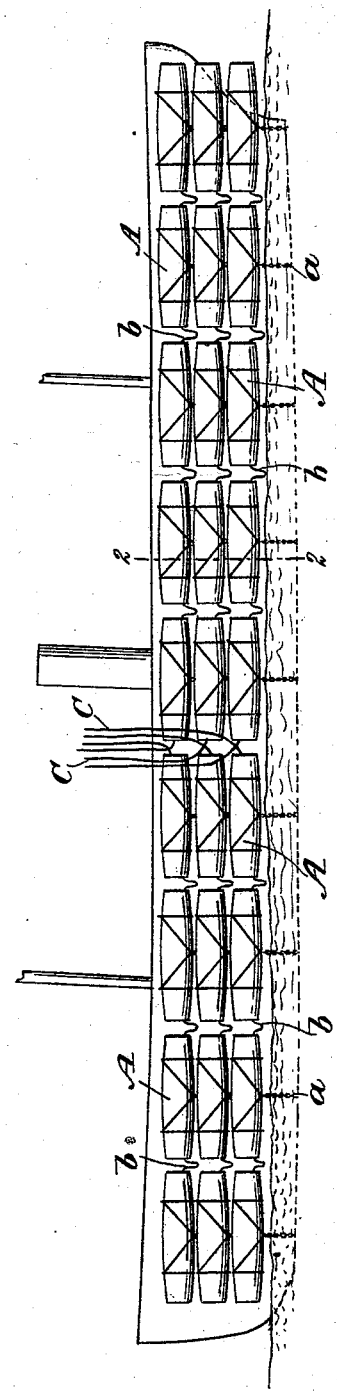
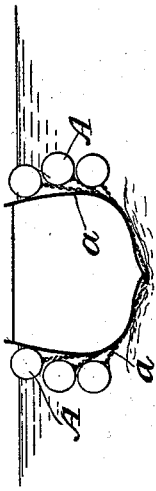
WITNESSES:
INVENTOR
Albert G. Midford
BY
ATTORNEYS.

(No Model.) 5 Sheets—Sheet 2.
A. G. MIDFORD.
APPARATUS FOR RAISING SUNKEN VESSELS.
No. 572,364. Patented Dec. 1, 1896.
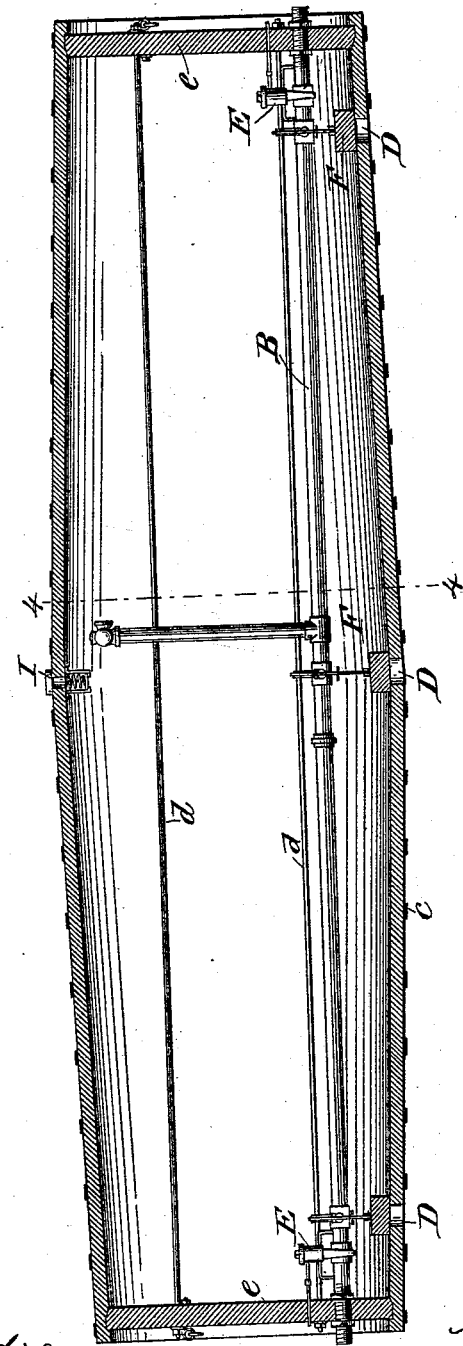

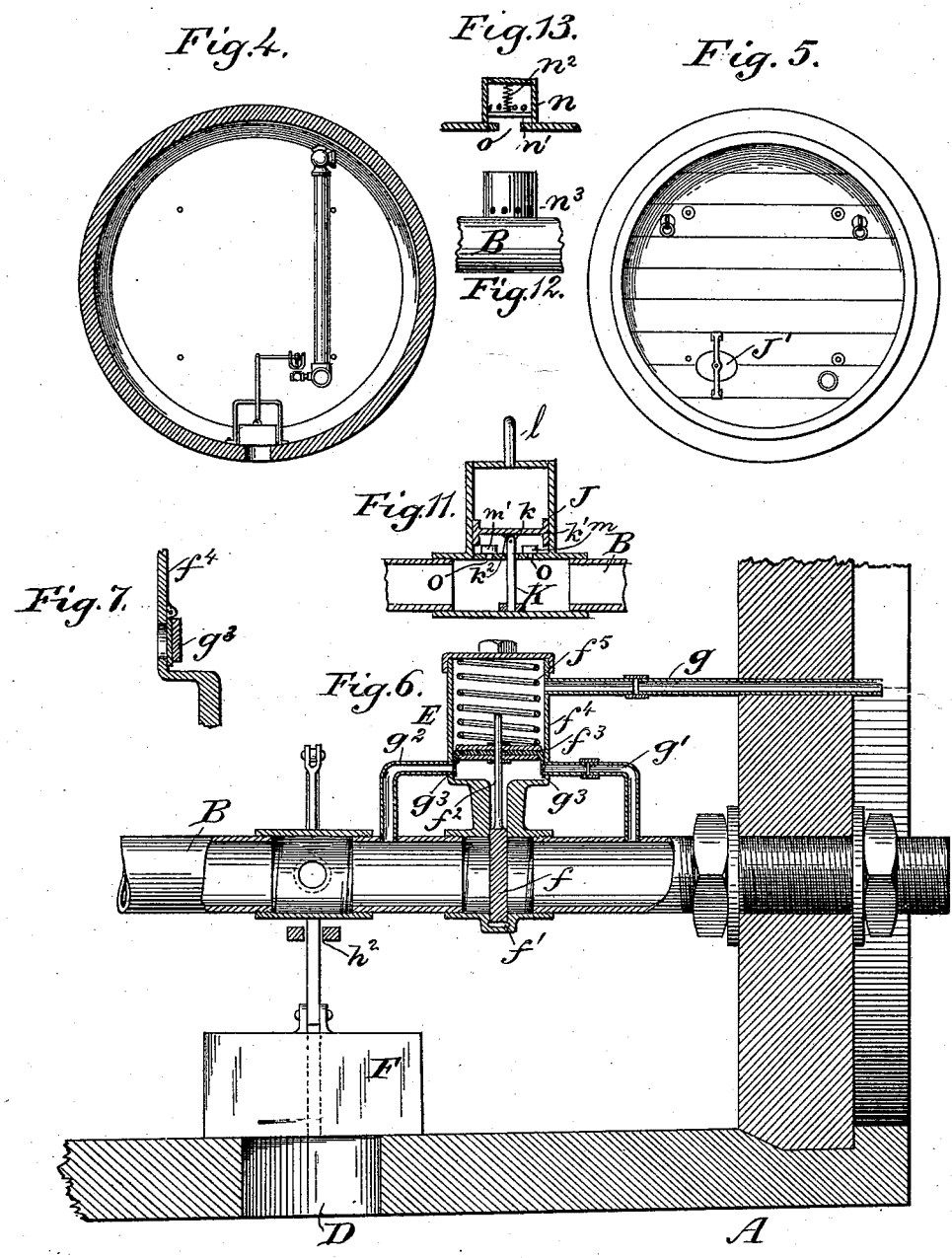

(No Model.) 5 Sheets—Sheet 4.
A. G. MIDFORD.
APPARATUS FOR RAISING SUNKEN VESSELS.
No. 572,364. Patented Dec. 1, 1896.
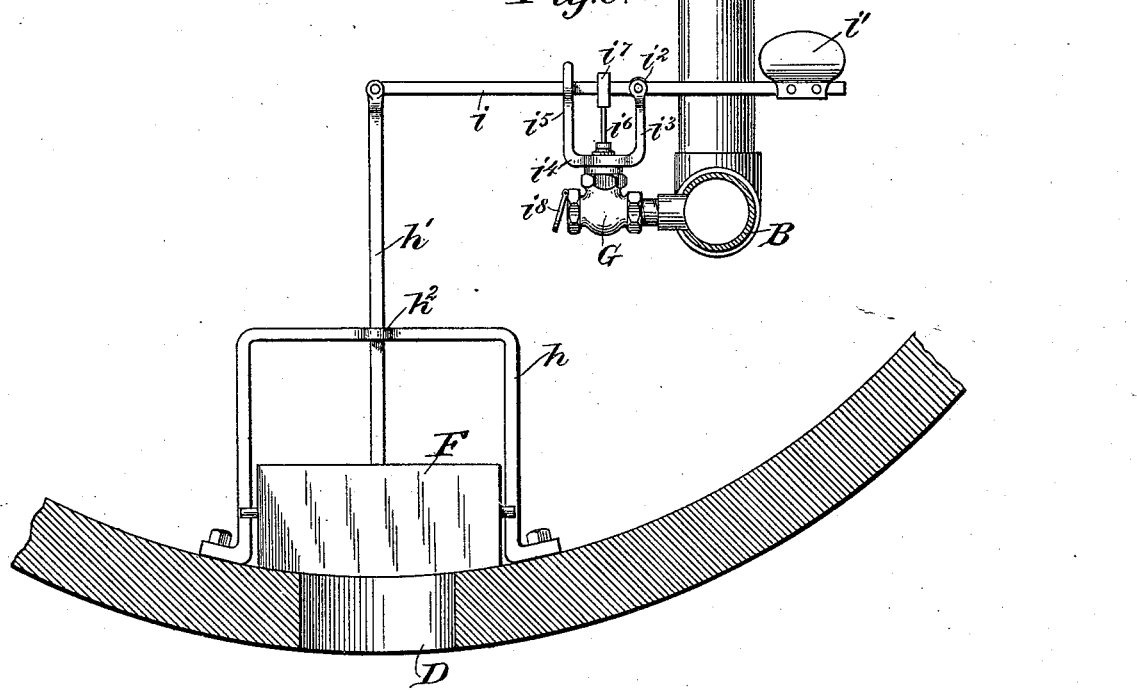
WITNESSES:
L. W. Legendre
J. V. Flynn
INVENTOR
Albert G. Midford,
BY
F. W. Barker
ATTORNEY (No Model.) 5 Sheets—Sheet 5.
A. G. MIDFORD.
APPARATUS FOR RAISING SUNKEN VESSELS.

No. 572,364. Patented Dec. 1, 1896.

WITNESSES:
L. N. Legendre
J. V. Flynn

INVENTOR
Albert G. Midford
BY
F. W. Barker
ATTORNEY.

UNITED STATES PATENT OFFICE.

ALBERT G. MIDFORD, OF NEW YORK, N. Y., ASSIGNOR TO THE MIDFORD PNEUMATIC SALVAGE COMPANY, OF SAME PLACE.

APPARATUS FOR RAISING SUNKEN VESSELS.

SPECIFICATION forming part of Letters Patent No. 572,364, dated December 1, 1896.

Application filed July 11, 1896. Serial No. 598,830. (No model.)

*To all whom it may concern:*

Be it known that I, ALBERT G. MIDFORD, a subject of the Queen of Great Britain and Ireland, residing at New York, in the county and State of New York, have invented certain new and useful Improvements in Apparatus for Raising Sunken Vessels, of which the following is a full, clear, and exact specification.

In the employment of caissons, pontoons, or the like for the purpose of raising sunken vessels recourse must be had to some expedient whereby such caissons, &c., may be conveniently lowered in the water to the wreck to which they are to be connected, and such caissons to prove effective in practice must be so arranged that they, or a series thereof, may be rendered buoyant by simultaneous inflation and for ease in manipulation preferably from a common supply.

To this end and for the purpose of providing apparatus which can be connected to a sunken vessel by divers to raise such vessel, I have invented certain devices consisting, essentially, of means governing the entry of air into what I term a "service-pipe," said service-pipe acting as a common supply for a series of caissons which are arranged along its route, the said governing means comprising a valve which is held normally closed by hydrostatic pressure and is opened by a greater air-pressure. I also provide in connection with the air-supply valves in the aforesaid service-pipe means whereby said valves, which are normally open when the caisson contains water, may be automatically closed when the water has been displaced by air. Thus the water-discharge ports are arranged to be closed by float-valves which have a mechanical connection with the aforesaid valves. With the devices thus far named and by the arrangement of caissons preferably in tiers along each side of the vessel to be raised, the caissons at either side of the vessel being connected by suitable means passed underneath the vessel, air may be pumped through a single connecting-pipe passing from a wrecking vessel provided with suitable pumping mechanism to the service-pipe. The caissons which were filled with water to enable them to be lowered to the place of action may be all, or a series of them, charged simultaneously with air and the water expelled, whereby the said caissons are rendered equally buoyant.

A further object of my invention is to provide means whereby in the event of a storm arising or it being otherwise necessary for the wrecking vessel to leave the wreck for a time the caissons which may have been wholly or partly inflated may have the air released, allowing said caissons to fill with water again and thus lie at the bottom of the sea, their connecting-pipe being then disconnected from the wrecking vessel, buoyed, and anchored pending the return of the wrecking vessel to the scene of action.

In order that my invention may be clearly comprehended and explained in detail, I have annexed drawings hereto illustrating the various parts in detail and showing their relative arrangement and coöperative connection.

In the drawings, Figure 1 indicates in side elevation a sunken vessel and shows my improved salvage apparatus adjusted thereto, said apparatus comprising series of caissons arranged in tiers longitudinally along the side of the vessel, it being understood that the opposite side of the vessel is similarly provided, the caissons on either side of said vessel being connected together by chains passing underneath the vessel. Fig. 2 is a cross-sectional view taken on the line 2 2 of Fig. 1, clearly showing the arrangement of caissons on both sides of the vessel and their connection. Fig. 3 is a vertical longitudinal view of a caisson, showing the air-service pipe and its connecting devices. Fig. 4 is a cross-sectional view of a caisson, taken on the line 4 4 of Fig. 3. Fig. 5 is an end view of a caisson. Fig. 6 is an enlarged vertical sectional view of a portion of a caisson, showing in detail the hydrostatic valve and its connection with the service-pipe. Fig. 7 is a further detail view of the hydrostatic-valve box, showing the flap-valve therein. Figs. 8 and 9 are enlarged detail views showing more clearly the valves controlling the passage of air from and to the service-pipe, the float-valve, and the connection between said valves, also showing the vertical branch pipe with its valve employed in deflating the caisson. Fig. 10 represents several caissons in front elevation, showing their arrangement and manner of connection. Figs. 11, 12, and 13 are detail views showing a modified construction of hydrostatic valve.

In the said figures the caissons are indicated by the letter A. These caissons, as shown by Figs. 1, 2, and 10, are arranged endwise in horizontal rows or tiers at each side of the vessel to be raised. The caissons are secured together by chains $a$, said chains also being passed underneath the vessel in order to connect the caissons at either side of said vessel. Each caisson is provided with an air-service pipe B, which extends longitudinally through the caisson A, and said pipes B, in adjacent caissons, are connected together by a flexible coupling-tube $b$. Preferably the caissons are so connected together in series, each series being supplied with and controlled through a single supply-pipe C, which should be connected to the service-pipe B of the outer caisson of a series, the other end of said supply-pipe C having communication with an air-pump on a wrecking vessel. (Not shown.)

The caissons which I prefer to employ are elongated in form and of a somewhat greater diameter at the center than at the ends to prevent the danger of their collapsing from outer pressure, being also strengthened against expansion by the hoops $c$. The brace-rods $d$, connected at the ends $e$ of the caisson, further add to its rigidity.

The caissons A are each provided with one or more (preferably three) ports D, whereby when said caissons are put overboard they may fill with water and sink to the bottom, there to be adjusted and connected to the sunken vessel by divers in the manner indicated in the drawings.

I will now proceed to describe the mechanism and means which I employ to cause the water within the caissons to be displaced by air, to render said caissons buoyant and capable of raising the sunken vessel to the surface, and the means for governing the air passed into the caissons.

The service-pipe B within each caisson is provided with a valve E, which when the caisson contains water is normally held closed by hydrostatic pressure. Said valve E comprises a shutter $f$, which fits slidably in a groove or recess $f'$ in pipe B, dividing said pipe and preventing the passage of air therethrough. A stem $f^2$ connects the shutter $f$ with a piston-head $f^3$, which is arranged to move vertically within a box $f^4$. A spiral spring $f^5$ is arranged between the piston-head $f^3$ and the top of box $f^4$, the tension of said spring causing the shutter $f$ to be normally seated in its recess $f'$; but a pipe $g$, which affords an open communication between the interior of box $f^4$, above the piston-head $f^3$, and the water outside the submerged caisson, enables the hydrostatic pressure to keep the valve normally closed.

$g'$ is a pipe communicating between the interior of box $f^4$, underneath the piston-head $f^3$, and that portion of pipe B situate between the shutter $f$ and its exterior point.

$g^2$ is a pipe which communicates between the pipe B, on the opposite side of shutter $f$, and the box $f^4$ underneath piston-head $f^3$, its point of communication being preferably opposite that of pipe $g'$.

The pipes $g'$ and $g^2$ are each provided, where they enter box $f^4$, with a flap-valve $g^3$, which seats, respectively, against the mouth of said pipes $g'$ and $g^2$.

In Figs. 11, 12, and 13 will be seen a modified construction of the hydrostatic valve, and which I prefer to employ in practice.

J indicates the valve-box, and $k$ a piston-head contained therein. Said piston-head is provided with a right-angularly-arranged annular flange $k'$, enabling it to slide or move freely in a vertical line within the box J. A gate-valve K is connected to the piston-head $k$ by a swiveled piece $k^2$, said gate-valve K, when closed, operating to shut off the pipe B in the same manner as the shutter $f$ of valve E, previously described. Above the piston-head $k$ free communication is established with the exterior of the caisson by a pipe $l$, which abuts from the top of box J. Below said piston-head $k$ are arranged two valves $m$ and $m'$, one upon either side of gate-valve K, and each of them, when open, communicating with the interior of pipe B. Said valves $m$ $m'$ each consist of a box $n$, a disk $n'$ therein and held downward to close an aperture $o$, leading into pipe B, by a spring $n^2$, holes $n^3$ being provided around the box $n$, said holes being situated above the normal seated position of disk $n'$.

F indicates valves which, when the caisson is emptied of water, serve, one each, to close the ports D. Said valves F are made of some buoyant material, as cork, or are rendered buoyant, so that when the caisson contains water the said valves will be floated away from the ports D. A guard and guide way $h$ serves to limit the play of said float-valve and directs it to its seat.

$h'$ indicates a vertical rod which is passed through a guide-slot $h^2$ in guard $h$ and is connected to the float-valve F. A bar $i$ is arranged approximately right-angularly to said rod $h'$, being pivoted at one end to the upper end of said rod $h'$. Said bar $i$ is weighted at its free end, as by weight $i'$ or otherwise, and said bar $i$ is pivotally supported, as at $i^2$, by an arm $i^3$ of a bracket $i^4$, which is suitably sustained, as will appear hereinafter.

G indicates the casing of a plug-valve, which casing is connected to and communicates with the interior of pipe B. Said casing G supports the bracket $i^4$, whose other arm $i^5$, shaped as a crotch at its upper end, serves as a guide for the bar $i$. The stem $i^6$ of the plug-valve (not exposed) is provided with a slotted portion $i^7$ at its upper end, the bar $i$ being passed through the slot. By the connection thus described between the valve in the casing G and float D it will be seen that the one is controlled by the movement of the other. The mouth of the valve-casing G is furnished with a flap-valve $i^8$, seating inwardly, the same being shown in Fig. 8 partly raised for the purpose of clearer illustration.

H indicates a vertical branch pipe, which is supported upon and communicates with the interior of pipe B. The upper end of said pipe H is preferably arranged right-angularly to its length, so that the line of its mouth shall be approximately vertical, as indicated in Fig. 9; also, in the same figure will be seen a flap-valve $j$, pivoted at $j'$ so as to swing downwardly and having an outward bearing, as indicated at $j^2$.

I indicates a spring safety-valve, the same being arranged to open against a given pressure.

J' is an opening in the end of the caisson whereby access can be had to its interior, the said opening being suitably closed and secured, as shown.

The *modus operandi* of the apparatus is as follows: Assuming the caissons A to have been filled with water, sunk to the bottom, and connected to a sunken ship, as shown in Figs. 1 and 2, and a supply-pipe C connected to each series of caissons by being coupled at one end of pipe B in the first caisson of the series, and it being remembered that normally the valves E in each caisson are closed by hydrostatic pressure, it will be seen that air which is now pumped through pipe C will pass through pipe $g'$ into the box $f^4$ beneath piston-head $f^3$ or into box J through box $n$. Being prevented by flap-valve $g^3$ or by valve $m'$ in the modified construction from passing through pipe $g^2$ or its equivalent, the pressure will quickly force up the piston-head $f^3$ or $k$ against the hydrostatic pressure, which action will of course remove the shutter $f$ or K from the path of pipe B, and the passage will thus be clear through the length of said pipe in that particular caisson and through the coupling-pipe to the succeeding caisson. The valve E in said second caisson is overcome in the same manner, and so in quick succession are the valves E opened in the caissons of the series, the pipes B throughout the entire series of caissons being thus formed into a continuous service-pipe. Said pipes B thus charged inflate simultaneously all the caissons of the series through the valves G, the air thus entering the caissons serving to expel the water therefrom through ports D. In this connection I may say that the function of the weight $i'$ at the free end of bar $i$ is to act as a counterbalance to prevent the suction caused by the outflowing water from seating the float F. When the water has been expelled from the caisson, as from each of the caissons of the series, and sufficient air-pressure has accumulated within the caisson to seat the float-valve F, the action of such seating, communicated through rod $h'$, bar $i$, and stem $i^6$, will automatically close the valve G, and thus shut off further air supply from pipe B. The caissons, thus inflated, will perform their duty of raising the sunken vessel.

The stand-pipe H is provided for the contingency of a storm or some other emergency arising when perhaps the caissons may have been wholly or partly filled with air and it be necessary to sink them again, so that they be not lost or damaged, while the wrecking vessel seeks a place of greater safety. With the provision of said pipe H and the aid of pipe $g^2$ or its equivalent and flap-valve $i^8$ it is only necessary to slowly open the pipe C and to buoy and anchor it so that it may be found again. The air-pressure within the caissons will open valve $j$ and passing through pipes H and B will open shutter $f$ or K by passing through pipe $g^2$ into the box $f^4$ and forcing up a piston-head $f^3$, or through valve $m'$ into box J, forcing up piston-head $k$. The flap-valve $g^3$ of pipe $g'$ or the disk $n'$ in box $m$ serve to prevent the air from passing out without raising shutter $f$ or K.

The function of the flap-valves $i^8$ in this connection is to become seated against the mouth of valve-casing G, owing to the action caused by the passage of air through pipe B in exhausting, and thus said flap-valves prevent the water which by the exhaust of air will enter at ports D from passing through valve-casings G into pipes B and H. It will be noticed that the caisson is deflated through a valve $j$, situate in the higher portion of the caisson; but should water be permitted to pass up said pipe H it would close the valve $j$ and prevent the air from escaping; hence the importance of said valves $i^8$.

I am aware that various modifications of my improvements may be employed without departing from the spirit and scope of my invention, and I therefore do not wish to limit myself to the exact construction herein set forth; but

What I claim, and desire to secure by Letters Patent, is—

1. In a caisson for raising sunken vessels, the combination with a water-exit port, and a float-valve to close the same, of a counterbalance for said float to prevent it from closing by the suction of outgoing water, substantially as set forth.

2. In a caisson for raising sunken vessels, the combination with a water-exit port, and a float-valve to close the same, of a weighted lever pivotally connected with said float-valve, and acting as a counterbalance, substantially as set forth.

3. In a caisson, an air service and discharge pipe passed therethrough, a valve in said pipe, said valve closing by hydrostatic pressure, and a connection between said pipe and valve from either side of the valve, whereby a greater pressure passed through said pipe in either direction will cause said valve to open, substantially as set forth.

4. In a caisson, a service-pipe passed therethrough, a vertical branch pipe communicating with said service-pipe, and a valve in said branch pipe permitting egress from, but preventing ingress to said caisson, substantially as set forth.

5. In a caisson, a service-pipe passed therethrough, a vertical branch pipe communicating with said service-pipe, said branch pipe having a valve permitting the passage of air from said caisson to said service-pipe, a feed-opening from the service-pipe to the caisson, and a valve arranged to close said feed-opening by the passage of air through said service-pipe in exhausting, substantially as set forth.

In testimony that I claim the foregoing I have hereunto set my hand this 22d day of April, 1896.

ALBERT G. MIDFORD.

Witnesses:
W. L. KANN,
CHAS. C. LEVENSON.